(12) United States Patent
Schmidt et al.

(10) Patent No.: US 9,333,902 B2
(45) Date of Patent: May 10, 2016

(54) DEVICE AND A METHOD FOR DETERMINING CONTROL PARAMETERS TO ADJUST THE LIGHT DISTRIBUTION OF A RIGHT HEADLIGHT AND A LEFT HEADLIGHT WHEN DRIVING THROUGH A CURVE

(71) Applicant: HELLA KGaA, Lippstadt (DE)

(72) Inventors: Jürgen Schmidt, Paderborn (DE); Tobias Irmscher, Gütersloh (DE); Boris Kubitza, Möhnesee-Körbecke (DE); Carsten Wilks, Lippstadt (DE); Andreas Krauβ, Erwitte (DE)

(73) Assignee: HELLA KGAA HUECK & CO. (DE)

( * ) Notice: Subject to any disclaimer, the term of this patent is extended or adjusted under 35 U.S.C. 154(b) by 1 day.

(21) Appl. No.: 13/682,467

(22) Filed: Nov. 20, 2012

(65) Prior Publication Data

US 2013/0201705 A1      Aug. 8, 2013

(30) Foreign Application Priority Data

Nov. 22, 2011   (DE) .......................... 10 2011 055597

(51) Int. Cl.
*B60Q 1/12* (2006.01)

(52) U.S. Cl.
CPC .......... *B60Q 1/122* (2013.01); *B60Q 2300/112* (2013.01); *B60Q 2300/122* (2013.01); *B60Q 2300/134* (2013.01); *B60Q 2300/32* (2013.01); *B60Q 2300/322* (2013.01)

(58) Field of Classification Search
CPC ............. B60Q 1/122; B60Q 2300/322; B60Q 2300/134; B60Q 2300/112; B60Q 2300/122; B60Q 2300/32; B60Q 2300/45

USPC .............................. 362/60–468, 512; 315/82; 340/435–437, 468–473; 701/36, 49, 701/28, 42
See application file for complete search history.

(56) References Cited

U.S. PATENT DOCUMENTS

| | | | | |
|---|---|---|---|---|
| 4,870,545 | A * | 9/1989 | Hatanaka et al. | 362/466 |
| 5,909,949 | A * | 6/1999 | Gotoh | 362/37 |
| 6,010,237 | A * | 1/2000 | Gotou | 362/460 |
| 7,234,849 | B2 * | 6/2007 | Hori et al. | 362/466 |
| 7,239,627 | B2 * | 7/2007 | Nattkemper et al. | 370/352 |
| 7,352,148 | B2 * | 4/2008 | Hashizume | 318/575 |

(Continued)

FOREIGN PATENT DOCUMENTS

| | | |
|---|---|---|
| DE | 19601572 A1 | 8/1996 |
| DE | 10239827 A1 | 3/2003 |
| DE | 102005036948 A1 | 7/2006 |

*Primary Examiner* — Anh Mai
*Assistant Examiner* — Arman B Fallahkhair
(74) *Attorney, Agent, or Firm* — Husch Blackwell LLP

(57) ABSTRACT

A device for determining control parameters to adjust the light distribution of a vehicle headlight when driving through a curve from a first or second angle relative to a longitudinal axis of the vehicle, the first angle determined from first information,
namely measurements and/or parameters to be adjusted via actuators of the vehicle, such as speed, steering angle, yaw rate, steering angle of the front wheels, distance from a second vehicle, or road progression ahead of the vehicle,
with a control means to determine the first angle the second angle,
with an interface to connect the device with actuators to adjust the light distribution of the headlight, where control parameter-signals can be provided.

16 Claims, 3 Drawing Sheets

(56) References Cited

U.S. PATENT DOCUMENTS

| | | | |
|---|---|---|---|
| 7,374,320 B2* | 5/2008 | Horii et al. | 362/466 |
| 7,429,120 B2* | 9/2008 | Sugimoto | 362/466 |
| 7,840,345 B2* | 11/2010 | Miyoshi | 701/438 |
| 7,860,627 B2* | 12/2010 | Horii et al. | 701/49 |
| 2008/0130302 A1* | 6/2008 | Watanabe | 362/466 |

* cited by examiner

DEVICE AND A METHOD FOR DETERMINING CONTROL PARAMETERS TO ADJUST THE LIGHT DISTRIBUTION OF A RIGHT HEADLIGHT AND A LEFT HEADLIGHT WHEN DRIVING THROUGH A CURVE

CROSS REFERENCE

This application claims priority to German Patent Application No. 10 2011 055597.8, filed Nov. 22, 2011, which is expressly incorporated in its entirety by reference herein.

TECHNICAL FIELD OF THE INVENTION

The invention relates to a device for determining control parameters to adjust the light distribution of a right headlight (SR) and/or a left headlight (SL) of a vehicle (F) when driving through a curve, with the control parameters determined from a first angle in reference to a longitudinal vehicle axis and/or a second angle in reference to the longitudinal axis of a vehicle (F), the first angle determined from first information and the second angle determined from second information comprising at least one interface for obtaining the first information, namely measurements and/or parameters to be adjusted via actuators of the vehicle, such as the speed, the steering angle, the yaw rate, the steering angle of the front wheels, the distance from a vehicle driving ahead and/or an oncoming vehicle, and for obtaining the second information regarding the road progression ahead of the vehicle, such as the radius of the curve being driven through, the distance from a striking point of the road progression, such as a start of a curve, an end of a curve, an inflexion point of the curve, the start or end of a road, a surface condition of a road, an interstate, a road within or outside city limits, with a control means to determine a first angle from the first information and a second angle from the second information, with one of the angles selectable via the control means for each headlight, with an interface to connect the device equipped with actuators to adjust the light distribution of the headlights or parts of the headlights, at which control parameter-signals can be provided, and with means to convert the angle selected by the control means for the right headlight and the angle selected by the control means for the left headlight into control parameter-signals.

BACKGROUND OF THE INVENTION

In prior art, devices are known to control the pivoting of the light beam of a right head-light and a left headlight of a vehicle, based on first information, such as based on the speed, the yaw rate, and the angle of the steering wheel (dynamic curve light). These devices improve both the illumination as well as visibility in roads with many curves. The use of first information, also called vehicle information, has proven disadvantageous, particularly when driving through curves and exits, because the pivotal angle of the headlights is only dynamically adjusted when the vehicle is already driving through curves or an exit.

In order to improve this situation, the so-called predictive curve light has been developed, in which the second information is used to adjust the light beam of the head-lights in a predictive fashion. The predictive headlight solves the problem of the dynamic curve light, which may develop for example when driving through curves or exits, because the headlights of the predictive curve light are always adjusted to the predictive pivotal angle.

Methods known today may lead to a maximum faulty adjustment of the predictive pivoted headlights in case of faulty information regarding the road progression. The consequences are an increased risk of blinding oncoming traffic, an illumination of the road traveled, which is not ideal, and a rising risk for accidents because the driver may be unnecessarily irritated and distracted by severely maladjusted headlights.

Furthermore, in methods known from prior art it is possible that at the transition between purely dynamic pivoting and purely predictive pivoting a ("cross-eyed") interference of the light beams can occur on the road. This effect is undesirable for optic reasons.

Another disadvantage in methods of prior art comprises that the driver, unlike in dynamic curve light, cannot influence the direction of pivoting of the headlights in the predictive pivoting. In practice this may lead to the predictive pivoted headlight reaching its maximally possible pivotal angle before the driver starts driving through the curve. This means, at the moment the driver moves the steering wheel no reaction occurs in the illumination because the headlights have already reached their maximally possible pivotal angle by the predictive adjustment. This is unusual for the driver and may reduce the acceptance of the system.

Further, devices are known by which both a dynamic as well as a predictive pivotal angle can be adjusted. Such a device is known for example from the document DE 10 2005 036 948 A1. From the document DE10 2005 036 948 A1 second information is used, such as curvature and/or curve radius and/or curve direction in addition to first information, for example the present speed and/or the present angle of the steering wheel, in order to determine the predictive and dynamic pivotal angle. Additionally, static and/or distance-related and/or speed-related start and end points of curves are required as control aids for the activation/deactivation and/or transitions between the adjustment of the dynamic and/or the predictive pivoting angle. The document DE 10 2005 036 948 shows, among other things, several options of how various predictive and dynamic pivotal angles can be selected for headlights. In one option a predictive pivotal angle is initially set without limits. When the dynamic pivotal angle fails to reach the predictive pivotal angle, e.g. after a predetermined period of time, the predictive pivotal angle is successively reduced to the dynamic pivotal angle, i.e. limited. The successively limited predictive pivotal angle is sent as a control parameter to the headlights.

Disadvantages of this method as well as other methods and devices for combining dynamic and predictive curve light are:
  When the predictive pivotal angle is flawed, the predictive pivotal angle is always selected initially with the potentially maximum error and converted into a control parameter for the headlight. The correction then only occurs when the dynamic pivotal angle fails to approach the predictive pivotal angle within a de-fined period of time. Until this correction is made, the driver is provided with less light than possible, particularly in case of maximum errors.
  The driver has no option, in selected predictive pivotal angles, particularly when entering a curve and/or leaving a curve as well as during corrective motions (e.g. when avoiding an obstacle) inside a curve to move the adjusted pivotal angle further into and/or out of the curve via steering motions. Thus, the driver has no influence upon the light on the road in front of him/her and particularly in dangerous situations in which the driver must deviate from the predicted road progression the light is not provided where the driver needs it, but in the predicted driving direction.

SUMMARY OF THE INVENTION

The present invention is based on the problem to improve the predictive adjustment of the light distribution of the headlights of a motor vehicle such that on the one hand errors of the prediction cannot lead to unlimited consequences and on the other hand the driver can influence the adjustment of light distribution, particularly in special driving situations.

The adjustment of the light distribution can occur, on the one hand, by the pivoting of a headlight or a portion of the headlight. Light diodes may be provided as the lighting means in headlights, which are switched to a so-called array of light diodes. By switching on or off individual light diodes or groups of light diodes of such an array of light diodes the light distribution of light emitted by such headlights can be modified. No pivoting occurs, here. The invention extends both to headlights with conventional lighting means as well as to headlights with arrays of light diodes. With regards to the invention here the pivoting of headlights or parts of headlights is not discussed. Any direction of pivoting or a pivoting angle is not discussed either in the context of the present invention, because these terms may be misleading in reference to headlights with arrays of light diodes.

The problem underlying the invention is attained according to the invention such that via the control means the second angle p can be limited to a limited second angle $p_L$ when an amount $|a|$ of a deviation $a=p-d$ between the second angle p and the first angle d is greater than a maximally permitted deviation $a_{max}$.

The directions and algebraic signs of angles, pivotal motions are equivalent to the definitions given in DIN ISO 4130. Accordingly, angles towards the left in reference to the longitudinal axis of the vehicle are marked with a negative algebraic sign and angles towards the right in reference to the longitudinal axis of the vehicle with a positive algebraic sign.

The limitation of the second angle p occurs according to the invention always when an excessive deviation $a_{max}$ of the determined second angle p from the first angle is given. Major deviations are frequently given when the second angle has been determined erroneously, because the second information was partially or entirely false. The error of the determination may not lead to unlimited consequences according to the invention and it remains ensured that the limited second angle used for determining the control parameter remains in context with the actual driving situation. Further, the driver can obtain increased influence upon the adjustment of the light distribution not predictable by the road progression because, for example by strong steering movements as a consequence of evasive maneuvers, the deviation of the second angle from the first angle is increased and thus a striking influence of the first angle can be achieved upon the angle to adjust the headlight, as explained in greater detail in the following.

The first and second angles represent interim parameters or variables which initially serve for calculation purposes within the control means. Only in conventional headlights the first angle and the second angle, (forming) adjustable angles in reference to the longitudinal axis of the vehicle, can commonly be called dynamic pivotal angles or predictive pivotal angles. The first angle and the second angle are not required to be allocated to units for any calculation within the control means. The naming of the first angle and the second angle as angles was selected only due to the proximity to dynamic pivotal angles and/or predictive pivotal angles. Here, a first value or a second value or the like could be used just as well.

The limited second angle $p_L$ may be equivalent to the first angle d plus the maximally permitted deviation $a_{max}$, when the second angle p is greater than the first angle d. However, when the second angle p is smaller than the first angle d, the limited second angle $p_L$ is advantageously equivalent to the first angle d minus the maximally permitted deviation $a_{max}$. In both cases, the first angle d shows a dominating influence upon the second angle.

Here, the maximally permitted deviation may be a constant value. It is also possible that the maximally permitted deviation $a_{max}$ is dependent on first information and/or second information. This way, an adjustment to the maximally permitted deviation to the driving situation and the predicted road progression is possible.

Using the control means of a device according to the invention for the right and the left headlight the second angle p and/or, in case of a limitation of the second angle p, the limited second angle $p_L$ can be selected as the angle used to determine the control parameters. If the (device) according to the invention is used to determine control parameters to adjust the light distribution of conventional headlights, here at both headlights the predictive pivotal angle p and/or the limited predictive pivotal angle $p_L$ are adjusted.

Using the control means of a device according to the invention the first angle d can be selected for the right headlight and the second angle for the left headlight, and/or in case of a limitation of the second angle p, the limited second angle $p_L$, when the second angle p is smaller than the first angle d. Alternatively, using the control means of a device according to the invention, for the left headlight the first angle d can be selected and for the right headlight the second angle p and/or, in case of a limitation of the second angle p, the limited second angle $p_L$, when the second angle p is greater than the first angle d. It is also possible that in one of the two headlights the first angle is adjusted and at the other of the two headlights the second and/or the limited second angle is adjusted. This may lead to a wider illumination of the area ahead of the vehicle, particularly when driving through curves.

The control means of a device according to the invention may be suitable and implemented such that it can be alternated between the selection of the first angle d for one of the headlights and the selection of the second angle p and/or the limited second angle $p_L$ for the same headlight, when the first angle d is equivalent to the second angle p.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
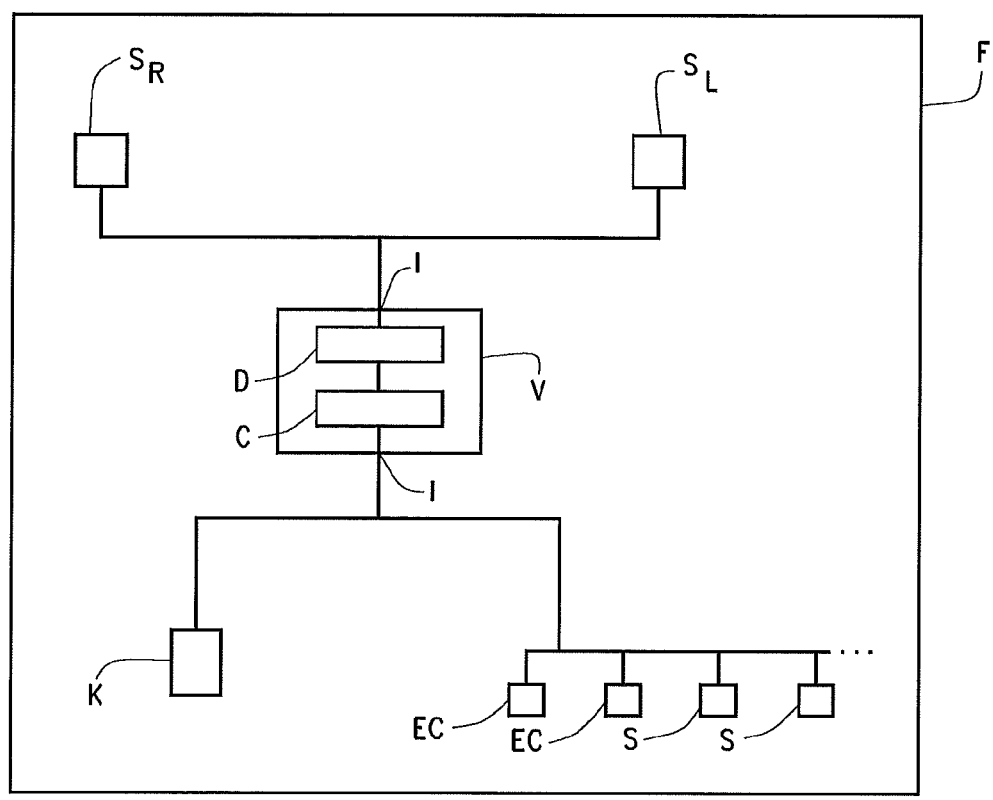
FIG. 1 a schematic illustration of a vehicle with a device according to the invention and a right and a left headlight.

The vehicle F shown in FIG. 1 as a block shows a right headlight $S_R$ and a left headlight $S_L$. Both headlight preferably comprise engines as actuators, by which the headlights can be horizontally pivoted in order to horizontally pivot the beam direction of the headlights. This represents conventional headlights, not headlights with a LED array. This way it is possible to pivot the headlights $S_R$, $S_L$ such that they illuminate the road in the direction ahead of the vehicle. The vehicle is therefore equipped with so-called curve lighting.

As already explained at the outset, it is distinguished between the so-called dynamic curve lighting and the so-called predictive curve lighting.

The dynamic curve lighting only considers for the determination of the pivotal direction of the headlights information regarding the actual condition of the vehicle, described by first information, which can be provided by sensors S and/or control devices EC in the vehicle. It has already been stated in detail at the outset, which information may be included here. A pivotal angle determined based on first information is called the first angle. Due to the fact that this angle is actually adjusted at the headlights of the exemplary embodiment in the following the first angle shall be called the dynamic pivotal angle d.

When determining the direction of pivoting of the headlights the predictive curve lighting considers the information regarding the road ahead of the vehicle, particularly the road progression. This second information may for example be provided by a navigation system and/or by a camera system K. It has also already been stated what this second information may include. A pivotal angle determined based on the second information is called the second angle. Due to the fact that in the exemplary embodiment this angle is actually adjusted at the headlights in the following the second angle is called the predictive pivotal angle p.

In order to determine the dynamic pivotal angle d and the predictive pivotal angle p in the vehicle F the device according to the invention is provided to control the pivoting of a right headlight $S_R$ and a left headlight $S_L$ of a vehicle F.

The device V according to the invention comprises an interface I, by which the device V is connected to a camera system K and various control devices EC and sensors S. Via the interface I the first information and/or the second information provided by the control devices EC and/or sensors S and/or by a camera system may be obtained by the device V.

A control means C is provided in the device, which processes the first information and the second information and which determines the dynamic pivotal angle d from the first information and the predictive pivotal angle p from the second information. Using the control means C, it is additionally selected if the dynamic pivotal angle d or the predictive pivotal angle p shall be adjusted at the right and/or the left headlight $S_R$, $S_L$.

In the device, further a means is provided to convert the pivotal angle d, p selected from the control means C for the right headlight $S_R$ and the pivotal angle d, p selected by the control means C for the left headlight $S_L$ in the control parameter-signal. The control parameter-signals may be transmitted via another interface I to the actuators of the headlights $S_R$, $S_L$. The actuators process the control parameter-signals to pivot or to displace the pendentive e.g., in LED systems according to the selected pivotal angle d, p.

Figure 2:
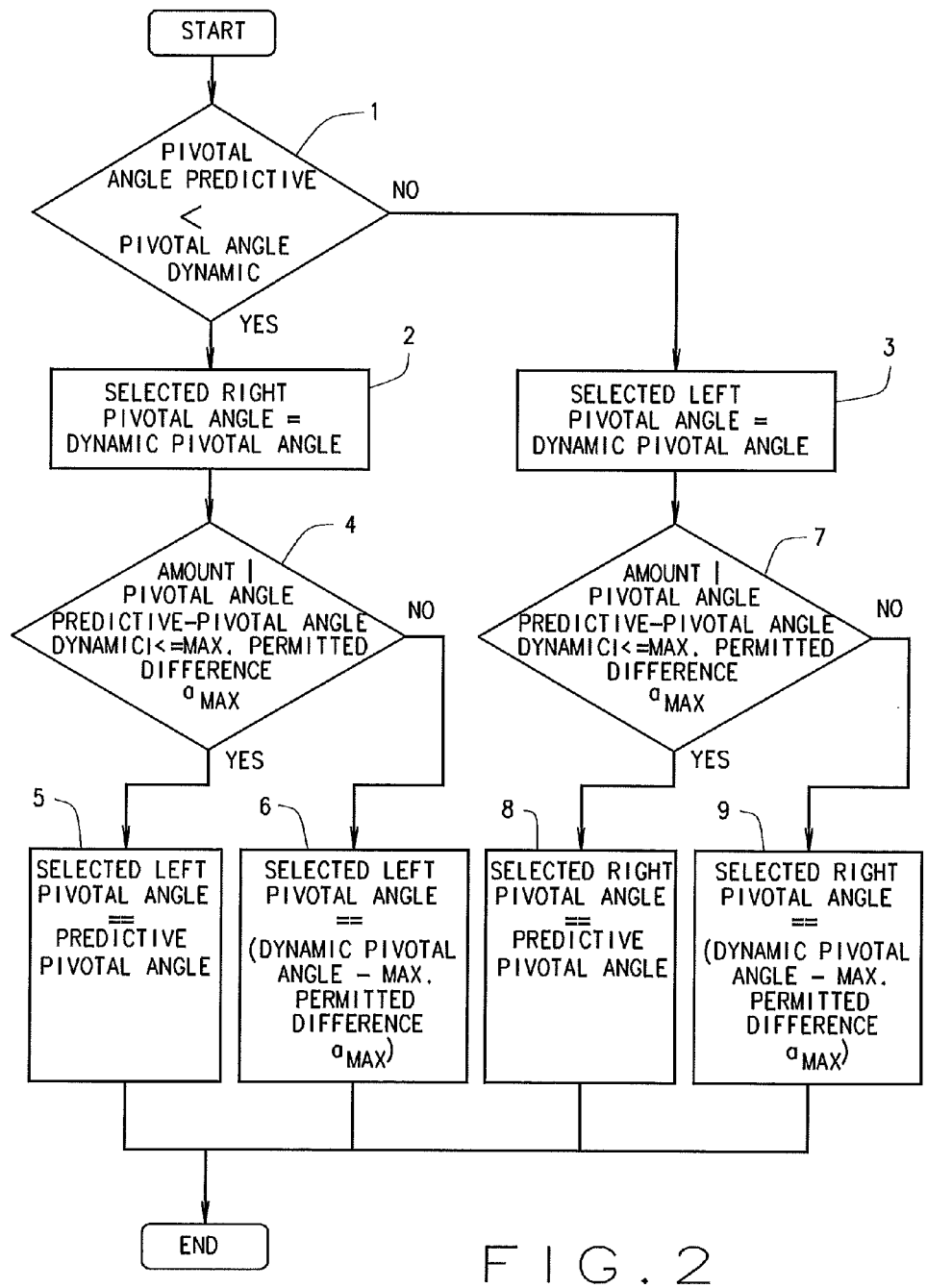
FIG. 2 a flow chart of a method performed by a device according to the invention, in which a first angle is adjusted at a headlight and a second and/or limited second angle is adjusted at another (headlight), and FIG. 3 a flow chart of a method that can be performed according to a device according to the invention, in which a second and/or second limited angle is adjusted at both headlights.
Figure 3:
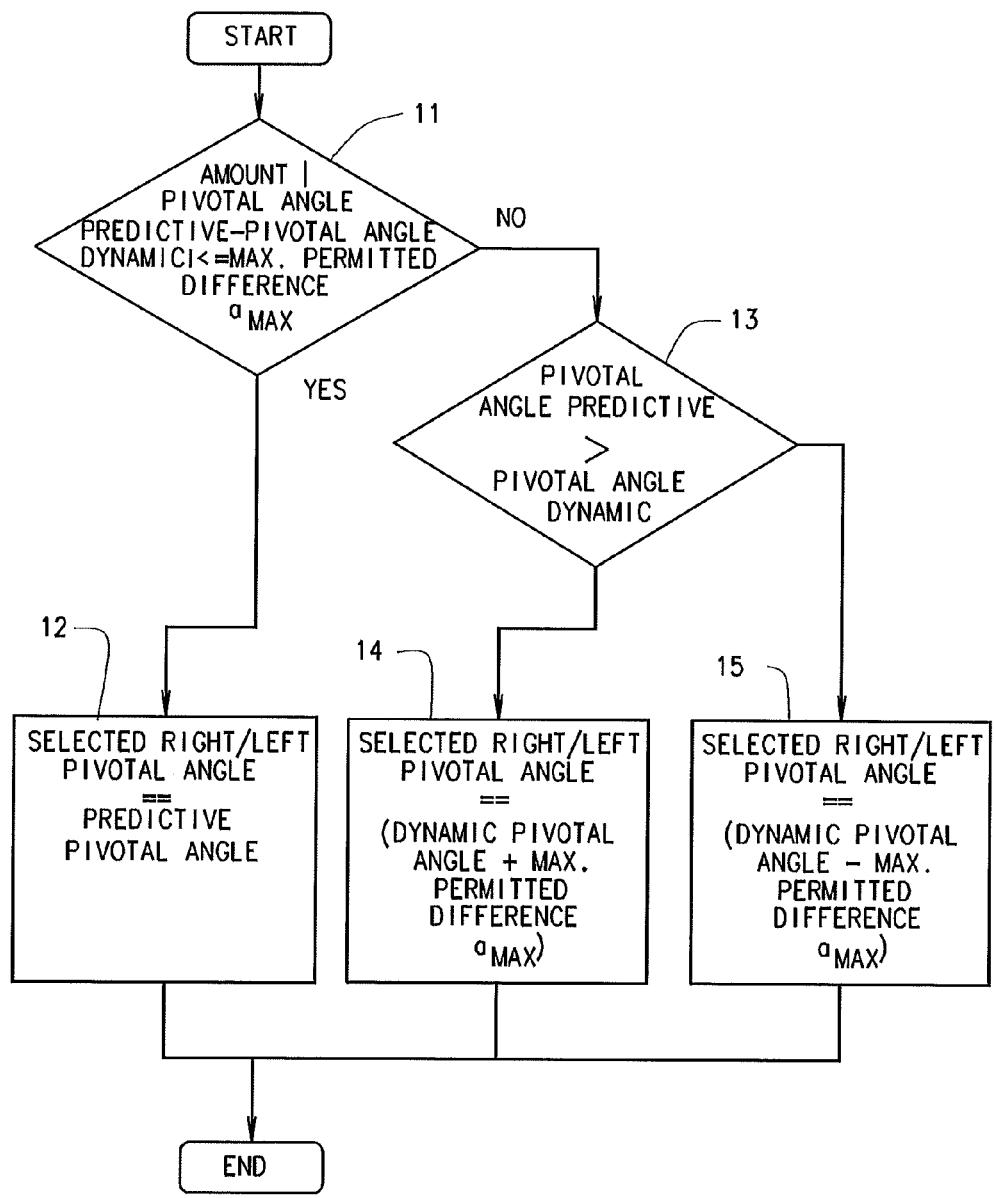

The selection of the pivotal angle occurs e.g., according to the method shown in FIG. 2 or in FIG. 3.

After the dynamic pivotal angle and the predictive pivotal angle have been determined, it is selected according to the method shown in FIGS. 2 and 3 which pivotal angle shall be adjusted at the headlights $S_R$, $S_L$. Additionally, a limitation of the predictive pivotal angle is set, if applicable.

After the method shown in FIG. 2 has been initiated, in a step 1 first it is checked if the predictive pivotal angle p is smaller than the dynamic pivotal angle. If that is the case, in a step 2 the dynamic pivotal angle is selected as the pivotal angle to be set for the right headlight $S_R$. If this is not the case, in step 3 the dynamic pivotal angle is selected for the left headlight $S_L$.

After step 2 has occurred, in step 4 it is checked if the amount |a| of the deviation a=p−d of the predictive pivotal angle p from the dynamic pivotal angle d is smaller or equivalent to a maximally permitted deviation $a_{max}$. If this is the case, in step 5 a pivotal angle is selected to be adjusted for the left headlight of the predictive pivotal angle. If this is not the case, in step 6 a limited predictive pivotal angle $p_L$ is determined for the left headlight, which is equivalent to the difference d−$a_{max}$ from the dynamic pivotal angle d and the maximally permitted deviation $a_{max}$.

After step 3 has occurred, it is checked in step 7 similar to step 4 if the amount |a| of the deviation a=p−d of the predictive pivotal angle p from the dynamic pivotal angle d is smaller or equivalent to a maximally permitted deviation $a_{max}$. If this is the case, in step 8 the predictive pivotal angle is selected as the pivotal angle to be adjusted for the right headlight. If this is not the case, in step 9 a limited predictive pivotal angle $p_L$ is determined and selected for the right headlight, which is equivalent to the total d+$a_{max}$ from the dynamic pivotal angle d and the maximally permitted deviation $a_{max}$.

According to a method shown in FIG. 2, here for a headlight SR, SL always the dynamic pivotal angle is selected, while for the other headlight $S_L$, $S_R$ either the predictive pivotal angle p or the limited predicted pivotal angle $p_L$ is selected.

After the start of the method shown in FIG. 3, in a step 11 it is first checked if the amount |a| of the deviation a=p−d of the predictive pivotal angle p of the dynamic pivotal angle d is smaller or equivalent to the maximally permitted deviation $a_{max}$. If this is the case, in step 12 the predictive pivotal angle p is selected as the pivotal angle to be adjusted for the right headlight $S_R$ and the left headlight $S_L$. If this is not the case, it is checked in step 13 if the predictive pivotal angle p is greater than the dynamic pivotal angle. If this is the case, in a step 14, for the right headlight $S_R$ and the left headlight $S_L$ a limited predictive pivotal angle $p_L$ is determined and selected, which is equivalent to the total d+$a_{max}$ from the dynamic pivotal angle d and the maximally permitted deviation $a_{max}$. If after the review in step 13 it shows that the predictive pivotal angle p is smaller or equivalent to the dynamic pivotal angle d, in a step 15 for the right headlight $S_R$ and the left headlight $S_L$ a limited predictive pivotal angle $p_L$ is determined and selected, which is equivalent to the difference $d-a_{max}$ from the dynamic pivotal angle d and the maximally permitted deviation $a_{max}$.

The above explanations of the present invention shall be understood as examples only and are not restrictive to the scope of the present invention. The teaching of the present invention can easily be transferred to other applications. The description of the exemplary embodiments is provided for illustration purposes only, and shall not limit the scope of protection of the claims. Many alternative, modifications, and variants are obvious for one trained in the art without here the scope of protection of the present invention being exceeded, which is defined in the following claims.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE CHARACTERS

F Vehicle
SR Right headlight
SL Left headlight
S Sensors
V Device according to the invention
EC Control devices
K Camera system
I Interface
C Control means
D Means for conversion

The invention claimed is:

1. A device for determining control parameters to adjust the light distribution of a left headlight of a vehicle when driving through curves, wherein control parameters are determined from at least one of a first angle in reference to a longitudinal axis of the vehicle and a second angle in reference to said longitudinal axis of the vehicle, comprising:
at least one interface operable for obtaining a first set of information, said first set of information selected from the group consisting of the speed, the steering angle, the yaw rate, the steering angle of the front wheels, and the distance from another vehicle, and for obtaining a second set of information, said second set of information selected from the group consisting of the radius of the curve presently driven through, the distance from a striking point of the road progression, and a particular surface structure of a section of a road;
a controller operable for determining said first angle solely from said first set of information and said second angle solely from said second set of information, and further operable for selecting said second angle as a selected angle for said left headlight when said first angle is larger than said second angle;
an interface with at least one actuator for adjustment of at least a portion of said left headlight, wherein said actuator is operable to adjust said left-headlight to said selected angle;
wherein said controller is also operable for restricting said second angle to a restricted second angle, when an amount of a deviation between said second angle and said first angle is greater than a maximally permitted deviation.

2. The device according to claim 1, wherein said controller is operable to select said first angle for a first headlight and either said second angle or, when said second angle is smaller than said first angle, said restricted second angle for a second headlight.

3. The device according to claim 2, wherein said controller is operable for selecting said first angle for said second headlight and either said second angle or, when said second angle is greater than said first angle, said restricted second angle for said first headlight.

4. The device according to claim 3, wherein said controller is operable for alternating between selection of said first angle for one of said headlights and selection of said second angle, or said restricted second angle when said first angle is identical to said second angle.

5. The device according to claim 1, wherein said restricted second angle is equivalent to said first angle plus said maximally permitted deviation, when said second angle is greater than said first angle.

6. The device according to claim 1, wherein said restricted second angle is equivalent to said first angle minus said maximally permitted deviation, when said second angle is smaller than said first angle.

7. The device according to claim 1, wherein said maximally permitted deviation is dependent on one of said first set of information or said second set of information.

8. The device according to claim 1, wherein said controller is operable to select one of said second angle and said restricted second angle for said headlight.

9. A device for determining control parameters to adjust the light distribution of a right headlight of a vehicle when driving through curves, wherein control parameters are determined from at least one of a first angle in reference to a longitudinal axis of the vehicle and a second angle in reference to said longitudinal axis of the vehicle, comprising:
at least one interface operable for obtaining a first set of information, said first set of information selected from the group consisting of the speed, the steering angle, the yaw rate, the steering angle of the front wheels, and the distance from another vehicle, and for obtaining a second set of information, said second set of information selected from the group consisting of the radius of the curve presently driven through, the distance from a striking point of the road progression, and a particular surface structure of a section of a road;
a controller operable for determining said first angle solely from said first set of information and said second angle solely from said second set of information, and further operable for selecting said second angle as a selected angle one of said first and second angles for said right headlight when said second angle is larger than said first angle;
an interface with at least one actuator for adjustment of a light distribution of said right headlight or a portion of said right headlight, wherein said actuator is operable to adjust said right headlight to said selected angle;
wherein said controller is also operable for restricting said second angle to a restricted second angle, when an amount of a deviation between said second angle and said first angle is greater than a maximally permitted deviation.

10. The device according to claim 9, wherein said controller is operable to select said first angle for a first headlight and either said second angle or, when said second angle is smaller than said first angle, said restricted second angle for a second headlight.

11. The device according to claim 10, wherein said controller is operable for selecting said first angle for said second headlight and either said second angle or, when said second angle is greater than said first angle, said restricted second angle for said first headlight.

12. The device according to claim 11, wherein said controller is operable for alternating between selection of said first angle for one of said headlights and selection of said second angle or said restricted second angle, when said first angle is identical to said second angle.

13. The device according to claim 9, wherein said restricted second angle is equivalent to said first angle plus said maximally permitted deviation, when said second angle is greater than said first angle.

14. The device according to claim 9, wherein said restricted second angle is equivalent to said first angle minus said maximally permitted deviation, when said second angle is smaller than said first angle.

15. The device according to claim 9, wherein said maximally permitted deviation is dependent on one of said first set of information or said second set of information.

16. The device according to claim 9, wherein said controller is operable to select one of said second angle and said restricted second angle for said headlight.

\* \* \* \* \*